US009998749B2

(12) United States Patent
Urbach

(10) Patent No.: US 9,998,749 B2
(45) Date of Patent: Jun. 12, 2018

(54) COMPOSITE VIDEO STREAMING USING STATELESS COMPRESSION

(75) Inventor: Julian Michael Urbach, Sherman Oaks, CA (US)

(73) Assignee: OTOY, INC., Los Angeles, CA (US)

( * ) Notice: Subject to any disclaimer, the term of this patent is extended or adjusted under 35 U.S.C. 154(b) by 773 days.

(21) Appl. No.: 12/907,906

(22) Filed: Oct. 19, 2010

(65) Prior Publication Data

US 2012/0093214 A1 Apr. 19, 2012

(51) Int. Cl.
*H04N 11/02* (2006.01)
*H04N 19/507* (2014.01)
*G06F 17/22* (2006.01)
G06F 17/24 (2006.01)
H04N 19/61 (2014.01)

(52) U.S. Cl.
CPC ....... *H04N 19/507* (2014.11); *G06F 17/2247* (2013.01); *G06F 17/24* (2013.01); *H04N 19/61* (2014.11)

(58) Field of Classification Search
CPC .. H04N 7/50; H04N 7/26244; H04N 7/26643; G06F 17/2247; G06F 17/24
USPC ............ 375/240.01, 240.24, 240.02, 240.08, 375/240.26; 382/239, 243, 236, 244
See application file for complete search history.

(56) References Cited

U.S. PATENT DOCUMENTS

| 6,058,210 | A | 5/2000 | de Queiroz |
| 6,208,761 | B1 * | 3/2001 | Passaggio ............ H04N 19/503 375/E7.026 |
| 6,388,584 | B1 * | 5/2002 | Dorward ............. H03M 7/3084 341/51 |
| 7,054,367 | B2 * | 5/2006 | Oguz ..................... H04N 5/142 348/E5.064 |
| 7,123,772 | B2 | 10/2006 | Estevez |
| 7,245,405 | B2 * | 7/2007 | Friedman et al. ............ 358/425 |
| 7,333,633 | B2 * | 2/2008 | Pylant .................. A01K 29/005 348/155 |
| 7,623,134 | B1 | 11/2009 | Danilak |
| 7,856,055 | B2 * | 12/2010 | Zhou .................... H04N 7/0112 375/240.12 |
| 2003/0142750 | A1 | 7/2003 | Oguz et al. |
| 2003/0177255 | A1 | 9/2003 | Yun |
| 2005/0231521 | A1 | 10/2005 | Harper |
| 2008/0055463 | A1 | 3/2008 | Lerner |
| 2008/0136829 | A1 | 6/2008 | Su |
| 2009/0164655 | A1* | 6/2009 | Pettersson ........... H04L 65/4015 709/231 |
| 2009/0201303 | A1 | 8/2009 | Westerhoff et al. |
| 2009/0290709 | A1 | 11/2009 | MacDonald et al. |

(Continued)

FOREIGN PATENT DOCUMENTS

| CN | 1479251 A | 3/2004 |
| WO | 8603922 A1 | 7/1986 |

(Continued)

OTHER PUBLICATIONS

International Search Report and Written opinion for International Application PCT/US2011/056906, dated Apr. 27, 2012.

(Continued)

*Primary Examiner* — Shawn An
(74) *Attorney, Agent, or Firm* — James J. DeCarlo; Greenberg Traurig, LLP

(57) ABSTRACT

A video rendering and streaming methodology that utilizes stateless video compression and video image segmentation to achieve enhanced video compression. In some implementations, the video compression and streaming techniques described herein can be deployed to allow for delivery of high-definition video games to client devices that host a standard browser.

14 Claims, 5 Drawing Sheets

(56) References Cited

U.S. PATENT DOCUMENTS

| | | |
|---|---|---|
| 2010/0141666 A1 | 6/2010 | Christopher et al. |
| 2010/0164970 A1 | 7/2010 | Lyons et al. |
| 2010/0296571 A1* | 11/2010 | El-Saban ......... H04N 21/21805 375/240.01 |
| 2010/0306813 A1 | 12/2010 | Perry et al. |
| 2012/0075411 A1* | 3/2012 | Matsumoto ............ G03B 37/00 348/36 |

FOREIGN PATENT DOCUMENTS

| | | |
|---|---|---|
| WO | WO 2007053304 | 5/2007 |
| WO | WO 2009038902 | 3/2009 |
| WO | WO 2010/111097 | 9/2010 |

OTHER PUBLICATIONS

M. Bautin, et al. Graphics Engine Resource Management, Multimedia Computing and Networking 2008, SPIE vol. 6818, pp. 68180O-1-68180O-12.
International Search Report (PCT/US2011/039897) dated Feb. 17, 2012; 3 pages.
Written Opinion for (PCT/US2011/039897) dated Feb. 17, 2012; 3 pages.
Official Action to corresponding CN Application No. 201180050412.0, dated Nov. 4, 2015.
Examination Report to corresponding EP Application No. 11 835 075.0, dated Aug. 5, 2016.

* cited by examiner

COMPOSITE VIDEO STREAMING USING STATELESS COMPRESSION

TECHNICAL FIELD

The present disclosure generally relates to video streaming.

BACKGROUND

A client-server architecture, in general, is a distributed computing architecture that partitions tasks or work loads between servers, which may be considered as "service providers", and clients, which may be considered as "service requesters" or "service consumers". Often, the servers and the clients are connected via a computer network and various types of data may be transmitted between individual servers and individual clients bi-directionally over the computer network.

The servers usually have more resources and greater performance capabilities than the clients. A server may share its resources with one or more clients, such as performing certain tasks for the clients (i.e., providing services to the clients). Because a server typically has more resources than a client, the server may complete a task, especially a resource-demanding task, much faster than the client is able to.

Data exchanged between a server and a client may be represented using any suitable data format and transmitted using any suitable communications protocol. For example, when an application is executed on a server for a client, the output of the application may be represented using a structured document, such as a HyperText Markup Language (HTML) document or an Extensible Markup Language (XML) document. The server may transmit the HTML or XML document, which includes the data that represent the output of the application, to the client over a HyperText Transfer Protocol (HTTP) connection between the server and the client. The client, upon receiving the HTML or XML document, may consume the document and render the output of the application locally using the HTML or XML document, such as in a web browser executed on the client.

Motion JPEG (M-JPEG) is a video format where each video frame or interlaced field of a digital video sequence is separately compressed as a JPEG image. In other words, M-JPEG employs stateless compression as information from a previously rendered frame is not used to compress the frames that follow. M-JPEG is however characterized by low-latency. When a client device receives a frame of compressed motion JPEG video, it can immediately decompress the frame and display it, resulting in very low latency. Originally developed for multimedia PC applications, where more advanced formats have displaced it, M-JPEG is now used by many portable devices with video-capture capability, such as digital cameras. Motion JPEG uses a lossy form of intraframe compression based on the discrete cosine transform (DCT). This mathematical operation converts each frame/field of the video source from the time domain into the frequency domain. A perceptual model based loosely on the human psycho-visual system discards high-frequency information, i.e. sharp transitions in intensity, and color hue. In the transform domain, the process of reducing information is called quantization. Quantization is a method for optimally reducing a large number scale (with different occurrences of each number) into a smaller one, and the transform-domain is a convenient representation of the image because the high-frequency coefficients, which contribute less to the over picture than other coefficients, are characteristically small-values with high compressibility. The quantized coefficients are then sequenced and losslessly packed into the output bit stream.

Mozilla and Webkit-based browsers have native support for viewing M-JPEG streams, other browsers can support M-JPEG streams using external plug-ins or applets. HTTP streaming separates each image into individual HTTP replies on a specified marker. RTP streaming creates packets of a sequence of JPEG images that can be received by clients such as QuickTime or VLC. The server software mentioned above streams the sequence of JPEGs over HTTP. A special mime-type content type multipart/x-mixed-replace; boundary=informs the browser to expect several parts as answer separated by a special boundary. This boundary is defined within the MIME-type. For M-JPEG streams the JPEG data is sent to the client with a correct HTTP-header. The TCP connection is not closed as long as the client wants to receive new frames and the server wants to provide new frames.

SUMMARY

The present invention provides methods, apparatuses and systems directed to a novel video rendering and streaming methodology that utilizes stateless video compression and video image segmentation to achieve enhanced video compression. In some implementations, the video compression and streaming techniques described herein can be deployed to allow for delivery of high-definition video games to client devices that host a standard browser.

These and other features, aspects, and advantages of the disclosure are described in more detail below in the detailed description and in conjunction with the following figures.

DESCRIPTION OF EXAMPLE EMBODIMENT(S)

Figure 1:
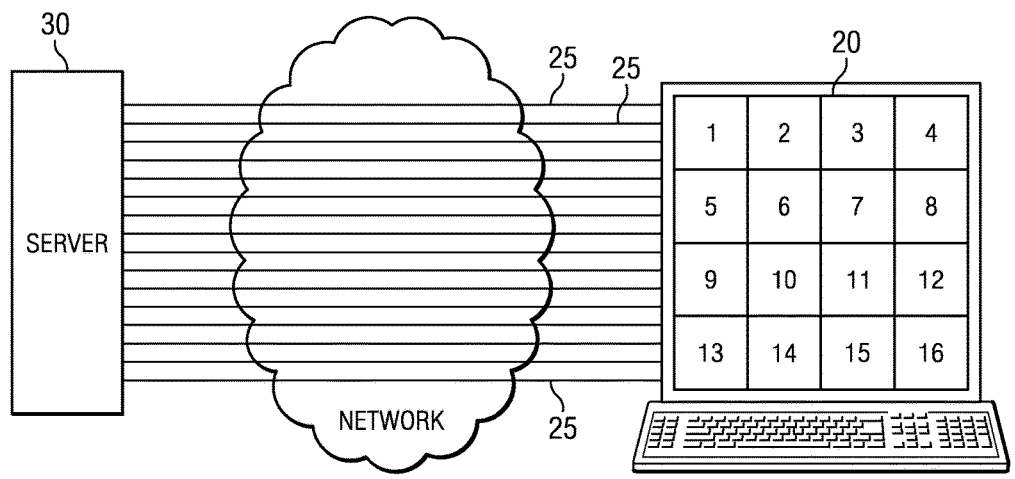
FIG. 1 is a schematic diagram illustrating a plurality of connections between a client and a server.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A client-server architecture enables a server to share its resources with one or more clients. Such an architecture has various advantages. For example, because the servers typically have more resources (e.g., processor or memory) and greater performance capabilities than the clients, a server may complete a task faster than a client is able to. Such performance difference is especially noticeable when the task is resource demanding or when the client has a limited amount of resources. At the same time, while the server is performing the task on behalf of or for the client, the resources of the client may be freed up to perform other tasks, such as those tasks that need to be performed locally on the client (e.g., interacting with the user of the client).

One type of task that may be suitable to be performed on the servers may be the rendering of an application hosted by a server as video output for transmission to a client. In the context of computer graphics, rendering may be considered as the process of generating an image from a model, usually by means of computer programs. The model is usually a description of three-dimensional (3D) objects and may be represented in a strictly defined language or data structure. The model may contain geometry, viewpoint, texture, lighting, shading, motion, and other suitable types of information. The image into which the model is rendered may be a digital image or a raster graphics image, which may be formed by a collection of pixels. The present disclosure expands the concept of rendering to generating an image that represents any output of any application. The rendering may be performed based on any data, including two-dimensional (2D) data as well as 3D data. In addition to generating images based on 3D models, particular embodiments may render images that represent the output of applications such as, for example and without limitation, web browsing applications. word processing applications, spread sheet applications, multimedia applications, scientific and medical applications, and game applications.

Rendering may be a type of task that is suitable to be performed by a server because the rendering process is often resource demanding, as it may be very computational intensive, especially when the rendered images are high resolution and high quality. In the past, it could have taken an older computer system hours or days to render a three-dimensional model into a single 2D image. With the development and advancement of computer hardware, especially computer hardware specifically designed for computer graphics applications (e.g., gaming, multimedia, entertainment, or mapping), present computer systems may be able to render each image within seconds or milliseconds. In fact, often it does not take all the available resources of a server to render a model into a single image.

Figure 5:
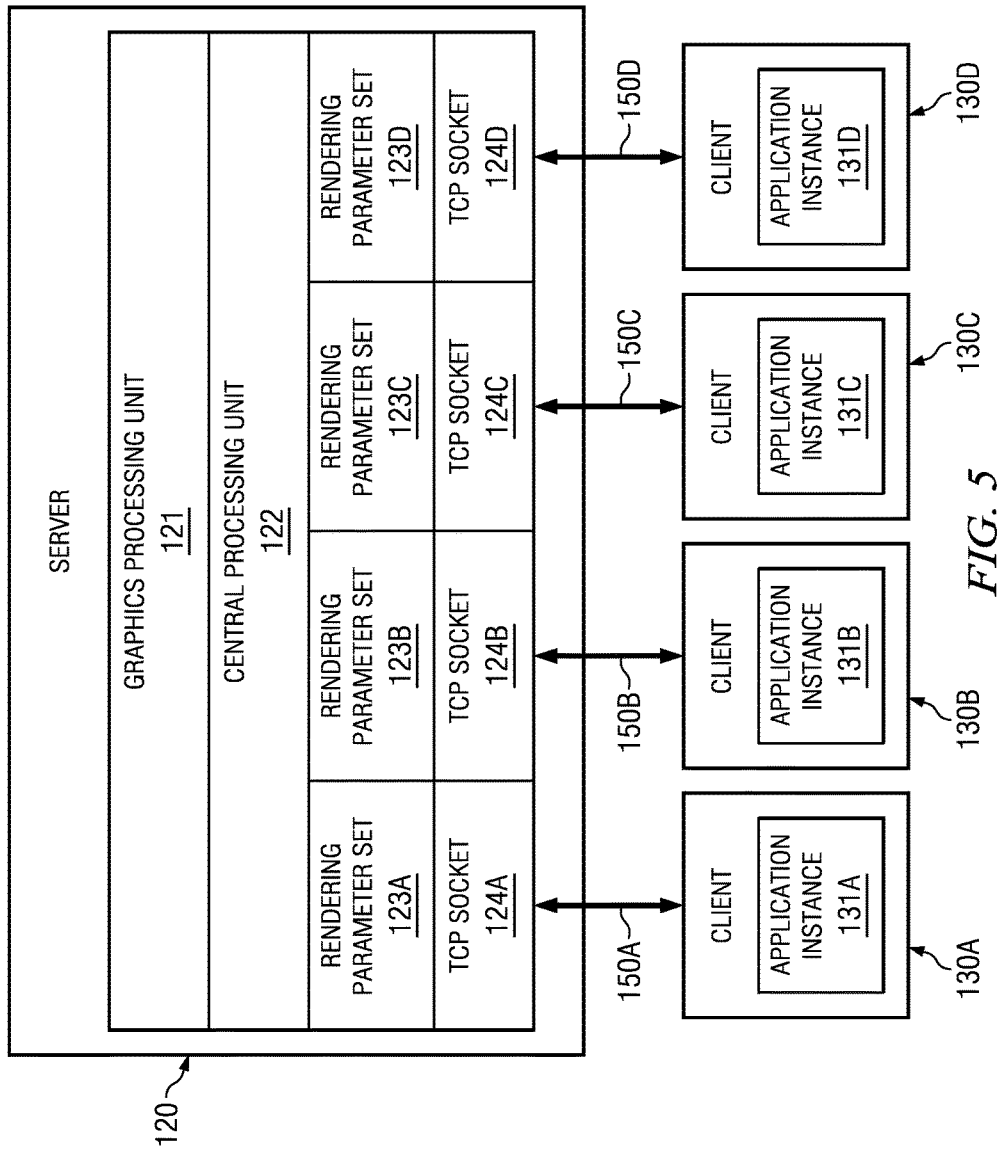
FIG. 5 illustrates an example client-server system for allocating a server's resources across multiple clients.

FIG. 5 illustrates an example system where a server 120 performs multiple renderings concurrently for multiple clients 130. Note that only four clients 130A, 130B, 130C, 130D are illustrated in FIG. 5 in order to simplify the discussion. In practice, a server may concurrently perform renderings for any number of clients and there is no theoretical limitation on how many clients a server may support at any time. Similarly, only one GPU 121 and one CPU 122 are illustrated in FIG. 5 in order to simplify the discussion. In practice, a server may have any number of GPUs and CPUs.

In particular embodiments, server 120 is connected with each of clients 130 via separate physical communication paths 150. In particular embodiments, communication paths 150 between server 120 and clients 130 may comprise network connections via a computer network, such as, for example and without limitation, the Internet, an Intranet, a Local Area Network (LAN), a Wide Area Network (WAN), a wireless network, or a combination of two or more such computer networks. In particular embodiments, each of network communication paths 150 may be a Transport Control Protocol (TCP) connection, a User Datagram Protocol (UDP) connection, or any other suitable connection. In particular embodiments, server 120 may have multiple TCP sockets 124, and each of clients 130 may be connected to one or more different TCP sockets 124.

In particular embodiments, data may be exchanged between server 120 and each of clients 130 bi-directionally via a corresponding communication path 150. For example, server 120 and client 130A may exchange data bi-directionally via communication path 150A. The data may be in any suitable format. For example, server 120 may transmit data to clients 130 in the form of video streams; and clients 130 may each transmit data to server 120. The communications between server 120 and clients 130 may use any suitable protocol. For example, suppose an instance of application 131A is executed on server 120 for client 130A. The rendered output of the instance of application 131A executed on server 120 may be transmitted from server 120 to client 130A in the form of a video stream, with each rendered image representing the output of the instance of application 131A as a particular frame of the video stream. Input received at client 130A, particularly those input that may cause the instance of application 131A executed on server 120 to change state, may be transmitted from client 130A to server 120.

In particular embodiments, server 120 may have one or more Central Processing Units (CPUs) 122 and one or more Graphics Processing Units (GPUs) 121. CPUs and GPUs are well known in the field of computer. Briefly, a CPU is the portion of a computer system that carries out the computer's functions and the instructions of computer programs. A GPU is a specialized processor that offloads graphics rendering from the microprocessor (e.g., the CPU). In general, GPUs are very efficient at manipulating computer graphics, and their highly parallel structure makes them more effective than general-purpose CPUs for a range of complex algorithms (e.g., graphics-related algorithms). In particular embodiments, GPU 121 may be a part of a video card or on the motherboard of server 120.

In particular embodiments, GPU 121 may include a rendering target. In particular embodiments, a rendering process renders the output of one or more applications as one or more images into the rendering target. In particular embodiments, the rendered 2D image may be stored in the rendering target of GPU 121. In particular embodiments, the rendering target may be a frame buffer or any suitable type of memory or storage within GPU 121. As discussed below, a rendering target may be partitioned into a number of portions or frame regions.

During playing of a game or use of an application hosted by server 120, a client system 130 receives keyboard and/or controller input from the user, and then it transmits the controller input via communications path 150 to server 120. Server 120 executes the gaming program code in response and generates successive frames of video output (a sequence of video images) for the game or application software. For example, if the user operates a joy stick or other controller in a manner that would direct a player character on the screen to move to the right, the application hosted on server 120 would then create a sequence of video images showing the player character moving to the right). This sequence of video images may be compressed and transmitted to client system 130 for display. The client system 130 decodes the compressed video stream and renders the decompressed video images on a display device, as discussed more fully below.

FIG. 1 provides a conceptual illustration of an embodiment of the invention. In one implementation, a client 20 hosting a browser or other client application may transmit an HTTP request for a web page that includes an embedded video stream. The video stream may be part of an interactive game or a pre-recorded video. In response to the request for a web page, the server 30 transmits a HyperText Markup Language (HTML) page to the client 20 for processing by the browser. As one skilled in the art will recognize, other structured document formats, such as XML, SGML and the like, can be used. In one implementation, the structured document may include a Javascript module that registers as a listener for various I/O input streams (such as mouse movement data, joystick data, keystrokes) and transmits the I/O input data to server 30.

The HTML page returned to the client 20 includes embedded references to a plurality of mjpeg streams. Each of the mjpeg streams corresponds to a unique region of the overall video image. As each mjpeg stream is a separate reference, the HTML code causes the browser to transmit separate HTTP requests for each stream, which in turn causes separate Transport Control Protocol (TCP) connections 25 to be established between the client 20 and server 30, as FIG. 1 illustrates. Relative to applications hosted on the client 20 and server 30, data is written to so-called sockets that correspond to each of the connections 25. FIG. 1 illustrates how a full video frame may be divided into sixteen unique frame regions. One skilled in the art will recognize that the number of grid cells and their aspect ratio may be varied. For example, the full video frame may be divided in columns to create a 1×N matrix, or by rows to create an N×1 matrix. In addition, the grid cells need not be uniform in size.

As discussed above, a property of mjpeg streams is that the JPEG images that form the sequence of video frames can be encoded and decoded relatively rapidly with low latency. Another attribute of mjpeg stream processing is that a browser displays the last received frame until a new frame is received. Accordingly, if no new frames are received, the browser will continue to display the last received frame.

The HTML code of the structured document is configured such that the unique regions of the full video frame are aligned with respect to each other as shown in FIG. 1. In one implementation, the frame regions can be aligned using an HTML table where each cell of the table corresponds to a different frame region. In other implementations, each frame region can corresponding to a DIV section. Cascading style sheet and absolute positioning properties can be used to fix the relative locations of the frame regions as desired. In one implementation, the server 30 may generate a series of video frames, each of the frames stored in a buffer as a bitmap in the memory of GPU (for example) or main memory (if CPU processing is used). As each full frame is stored to a buffer, a video transmission process may encode respective regions of the buffered full frame, and write encoded versions of respective regions of the buffered frame data to individual socket connections that correspond to each unique region of the full frame, as described in more detail below.

Figure 2:
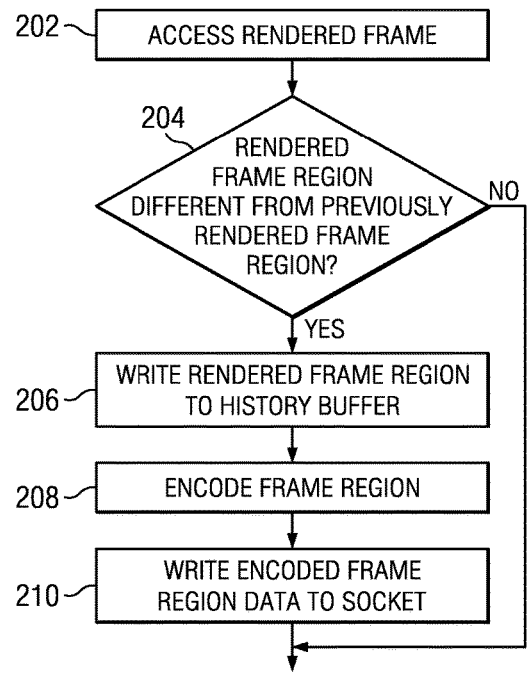
FIG. 2 is a flow chart diagram showing an example video streaming method.

FIG. 2 illustrates an example process for selectively writing encoded video frame data corresponding to unique regions of a full video frame. As FIG. 2 illustrates, a frame region delivery process accesses the currently rendered frame stored in a buffer (202) and determines whether the instant region of the rendered frame is perceptually different from the frame region stored in history buffer (204). If there is no perceptual difference between the current frame region and the previously rendered region in the history buffer, the frame region delivery process does not write the frame region data to the corresponding communications socket.

Determining whether one frame region is perceptually different from another frame region can be accomplished in a variety of manners. For example, the frame region delivery process may perform a pixel by pixel XOR operation on the component values of the bit map to determine whether there are differences at each pixel. In another implementation, a memory comparison function, such as memcmp (a standard C library function, can be used to compare frame regions. In one implementation, any detected difference is considered perceptually different. In other implementations, the frame region delivery process may perform a pixel-by-pixel comparison of the component values of the respective bit maps and compute a distance value (e.g., a Euclidian distance or the sum of the absolute values of the distances) between the component values of the respective bit maps. If the average or mean distance exceeds a threshold value, the frame regions are considered perceptually different.

If there is a perceptual difference between the current frame region and the previously rendered region in the history buffer, the frame region delivery process writes the frame region to the history buffer, overwriting a previously stored frame region (206). The frame region delivery process encodes the frame region (208), in one implementation, by compressing the bitmap data into a JPEG image and writing the encoded frame region data to a socket that corresponds to the frame region (210).

The frame region delivery process described above may be executed as separate threads for each frame region and/or executed in parallel, such as utilizing the massively parallel processing capabilities of a Graphics Processing Unit, as disclosed in U.S. application Ser. No. 12/797,788, which is incorporated by reference herein for all purposes. Based on the foregoing, one can recognize that the foregoing arrangement, by only transmitting frame region data when perceptual differences are detected in a given region, achieves a form of interframe compression utilizing a video compression and streaming method (here-M-JPEG) that is stateless. Accordingly, this form of enhanced video compression can be achieved in connection with remote hosts that only include a browser that supports M-JPEG and therefore does not require special-purpose client applications or codecs to be installed.

In the embodiment discussed above, the enhanced video compression functionality can be used to conserve bandwidth utilization. In other implementations, the video compression functionality can be used to increase video quality given some nominal or target bandwidth allocation. For example, server 30 may allocate a certain amount of bandwidth to the session with client 20. Increasing the resolution of an image or a region of an image (such as compressing an image less aggressively) increases bandwidth utilization. When frame data for a given region is not transmitted to client 30, bandwidth is conserved. Server 30 may operate to re-claim this saved bandwidth to increase the image resolution of other regions in the full video frame display. For example, if the video stream has been pre-recorded, a compression process can be executed to render each frame region in a first step and determine which regions have changes and which have not. In a second pass, the compression process may increase the video quality of one or more regions in a given frame based on the amount of bandwidth saved. For real-time video streams, such as video streams generated by game logic of a video game, the compression process may employ a statistical approach to monitor on a historical basis the relative bandwidth utilization of each region and allocate bandwidth to more active regions by increasing image quality to those regions. For example, based on the number of region frames transmitted over a sliding window of time and the average size of the frame region data, the compression process may compute an average bandwidth utilization for each region. In other implementations, the compression process may actually increase the resolution or image quality of less active regions under the assumption that less frames will be transmitted over some time interval.

Figure 3:
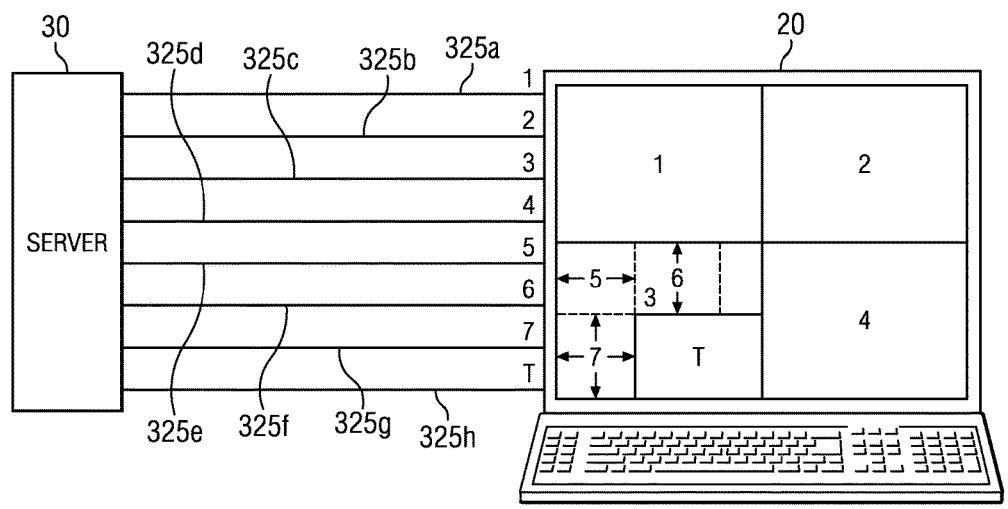
FIG. 3 is a schematic diagram illustrating a plurality of connections between a client and a server according to another implementation of the invention.

FIG. 3 illustrates another implementation of the invention including one or more transparent, positional video streams, the pixel width and/or height of which can be modulated to translate the position at which a target frame is rendered by a browser. FIG. 3 shows a plurality of TCP connections 325a-h between client 20 and server 30. The full video frame rendered by client includes a plurality of rendered frame regions, some of which are statically positioned and sized, while other regions may change dynamically in size or position as discussed in more detail below. TCP connections 325a-d correspond to regions 1-4 respectively of a full video frame. TCP connections 325e-g correspond to positional frames 5, 6, 7, while TCP connection 325h corresponds to translating frame region T.

In the implementation shown, frame regions 1-4 are rendered as background images transmitted in an M-JPEG stream. Positional frames are rendered as transparent frames overlayed on the background images of the frame regions and in the same layer as target frame region T. The positional frames may be rendered using a PNG format, the GIF format or any other format that supports transparency. Positional frames beyond being transparent essentially are invisible to the user as pixels are encoded with transparency values in either the alpha or transparency channel. The target frame T is rendered by the browser as an overlay on the background image frames. In some implementations, the target frame T can be used to render a main or predominant object in a scene, such as a gun in a "first-person shooter" video game or a car in a first-person driving game. A mask can be used to define transparent regions that surround the main object rendered in the target frame. The background frame regions 1-4 can contain the remaining elements of the scene, such as landscapes and other objects. Accordingly, in one implementation, one or more objects are rendered separately in the T frames, while one or more other objects are rendered in the frame regions 1-4. The generation, rendering, compression and transmission of frame regions 1-4 to a client 20 operate substantially the same as above. Moreover, there may be more than 4 background frame regions, such as 16 frame regions as discussed above. In addition, there may be one background frame or no background frame.

The positional frames 5-7 and target frame T are rendered by client application in the same layer. In the implementation shown, target frame T is positioned and rendered adjacent to the positional frames. In one implementation, this can be accomplished by transmitting a base HTML document that includes an HTML table element. The table can be a 2×2 table with 3 of the cells corresponding to the positional frames 5-7, while the target frame corresponds to the last cell (such as the upper right cell). The HTML table can be anchored or positioned in a corner of the display. To translate the target frame, the image size of the positional frames rendered in the other cells can be changed such that expansion and contraction of one or more of the positional frames causes translation of the target frame as perceived by the viewer. If only horizontal or vertical motion is desired a 1×2 or 2×1 table can be used. The positional frames 5-7 are aligned relative to background frame 3. However, the positional frames can also be aligned relative the overall display or other background frames. Accordingly, changes to the width or height of the positional frames 5-7 can cause the browser to render the target frame in different positions relative to the background frame regions and the overall display. In implementations, where the target frame T can be tied to a corner of a single frame, only one positional frame can be used. In one implementation, an HTML table with a single cell or an HTML DIV section can be used, where the background image is a transparent positional frame and the target image is aligned to a side or corner of the table or DIV section. In such an implementation, a change to the width or height of the background positional frame image causes the target frame to be rendered in a different position on the display. Implementations of the invention strategically modulate the aspect ratios of one or more of the positional frames to cause the browser to effectively change the position at which the target frame is rendered and displayed.

Figure 4:
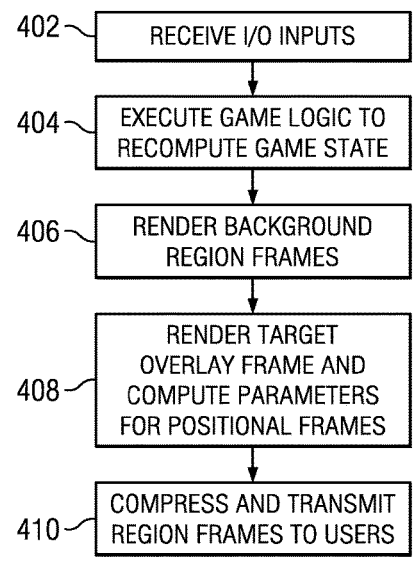
FIG. 4 is a flow chart diagram showing another example video streaming method.

In one implementation, this can be accomplished by transmitting over the TCP connections 325e-g transparent video frame data of a selected height and width as mjpeg streams. As movement of the target frame is desired, positional logic may determine changes to the height or width of one or more of the positional frames and transmit a new frame having a selected height and width. FIG. 4 illustrates an example process that may be used in a video game implementation. For example, assume for didactic purposes that the process is used in connection with a first-person shooter, such as Crysis® published by Electronic Arts, Inc. of Redwood City Calif. In such a game, the gun can be rendered in the target frame, while the remaining game objects and scene are rendered in the background frame regions. As FIG. 4 illustrates, server 20, in one implementation, may receive input/output inputs from client 30 (402), such as data characterizing mouse clicks or movements, joystick movements, keystrokes, game controller movements and the like. In one implementation, the structured document that is first transmitted down to the remote client and includes the inline references to the various streams may also include a Javascript module or other code object to receive I/O device inputs and transmit the inputs to the server for processing. Server 20 may execute the game logic based on the input/output inputs to adjust game state (404), such as the state of one or more objects in the game, such as player characters, non-player characters, buildings and the like. Server 20 may render video frames for the background including all objects except those included in the target frame (406) and separately render target frames based on the state of one or more objects associated with the target frame (408), such as a gun or a car. In one implementation, the rendering process for the target game renders the target object based on the object's state parameters, such as position and orientation, but centers the rendered object in the target frame. Server 20 also computes, based on the target object, the positional parameters for the target frame itself—that is, the coordinates as to where in the client display the target frame should be rendered. These positional parameters determine the width and height of the positional frame(s) required to position the frame in a desired location. Server 20 then compresses the region, positional and target frames and writes the compressed frames and transmits the region, target and positional frames to respective socket connections 325*a-h*.

Some implementations of the invention may achieve profound advantages. A mobile device, a laptop or desktop computer may not need to have special purpose client applications or codecs installed to view high quality video and/or play high-quality video games. For example, the implementation described above allows a user to play a video game with high-definition graphics quality with a browser only. For example, a user may access a site using a browser hosted by a mobile phone and simply access a page to play a video game. In another implementation, a user may play a high-quality video game simply by receiving an HTML-based email document.

Figure 6:
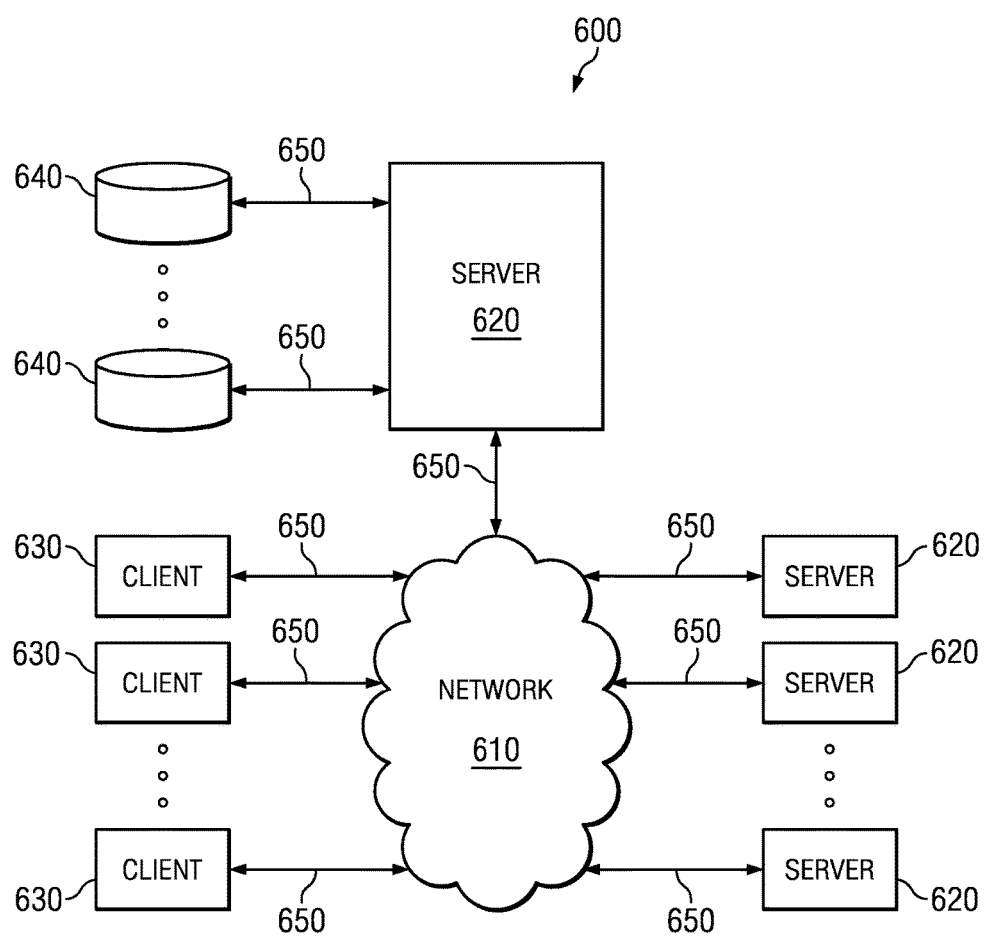
FIG. 6 illustrates an example network environment.

Particular embodiments may be implemented in a network environment. FIG. 6 illustrates an example network environment 600. Network environment 600 includes a network 610 coupling one or more servers 620 and one or more clients 630 to each other. In particular embodiments, network 610 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 610 or a combination of two or more such networks 610. The present disclosure contemplates any suitable network 610.

One or more links 650 couple servers 620 or clients 630 to network 610. In particular embodiments, one or more links 650 each includes one or more wired, wireless, or optical links 650. In particular embodiments, one or more links 650 each includes an intranet, an extranet, a VPN, a LAN, a WLAN, a WAN, a MAN, a communications network, a satellite network, a portion of the Internet, or another link 650 or a combination of two or more such links 650. The present disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, each client 630 may be an electronic device including hardware, software, or embedded logic components or a combination of two or more such components and capable of carrying out the appropriate functionalities implemented or supported by client 630. For example and without limitation, a client 630 may be a desktop computer system, a notebook computer system, a netbook computer system, a handheld electronic device, or a mobile telephone. A client 630 may enable an network user at client 630 to access network 610. A client 630 may have a web browser, such as Microsoft Internet Explorer or Mozilla Firefox, and may have one or more add-ons, plug-ins, or other extensions, such as Google Toolbar or Yahoo Toolbar. A client 630 may enable its user to communicate with other users at other clients 630. The present disclosure contemplates any suitable clients 630.

In particular embodiments, one or more data storages 640 may be communicatively linked to one or more servers 620 via one or more links 650. In particular embodiments, data storages 640 may be used to store various types of information. In particular embodiments, the information stored in data storages 640 may be organized according to specific data structures. Particular embodiments may provide interfaces that enable servers 620 or clients 630 to manage (e.g., retrieve, modify, add, or delete) the information stored in data storage 640.

In particular embodiments, each server 620 may concurrently service one or more clients 630 and perform renderings for the clients 630 it supports. A server 620 may transmit the images rendered for a particular client 630 it supports by encoding the rendered images in a video stream, with each rendered image as a particular frame, and transmits the video stream to the client 630. A client 630, upon receiving the video stream, may decode the video stream to exact the image frames for display. U.S. application Ser. Nos. 12/579,300 and 12/709,343, both of which are incorporated by reference herein for all purposes, discloses video codecs that may be used to deliver a compressed video stream to one or more clients 630. In addition, the foregoing applications also disclose how each server 620 may utilize the parallel processing resources of the GPUs to generate and stream the video data to the clients 630.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 7:
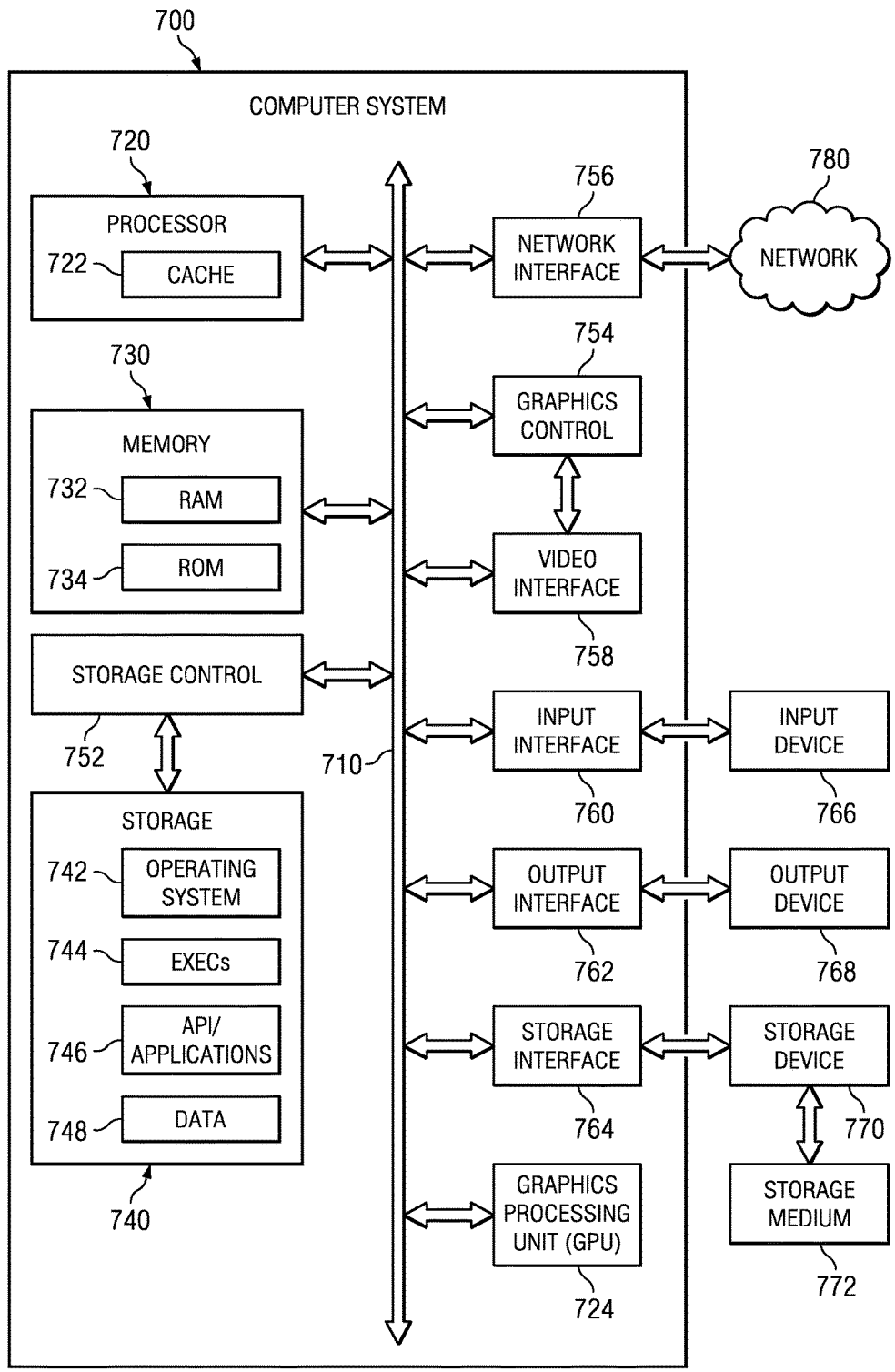
FIG. 7 illustrates an example computer system.

For example, FIG. 7 illustrates an example computer system 700 suitable for implementing one or more portions of particular embodiments. Although the present disclosure describes and illustrates a particular computer system 700 having particular components in a particular configuration, the present disclosure contemplates any suitable computer system having any suitable components in any suitable configuration. Moreover, computer system 700 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 710 couples subsystems of computer system 700 to each other. Herein, reference to a bus encompasses one or more digital signal lines serving a common function. The present disclosure contemplates any suitable system bus 710 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 700 includes one or more processors 720 (or central processing units (CPUs)). A processor 720 may contain a cache 722 for temporary local storage of instructions, data, or computer addresses. Processors 720 are coupled to one or more storage devices, including memory 730. Memory 730 may include random access memory (RAM) 732 and read-only memory (ROM) 734. Data and instructions may transfer bi-directionally between processors 720 and RAM 732. Data and instructions may transfer unidirectionally to processors 720 from ROM 734. RAM 732 and ROM 734 may include any suitable computer-readable storage media.

Computer system 700 includes fixed storage 740 coupled bi-directionally to processors 720. Fixed storage 740 may be coupled to processors 720 via storage control unit 752. Fixed storage 740 may provide additional data storage capacity and may include any suitable computer-readable storage media. Fixed storage 740 may store an operating system (OS) 742, one or more executables 744, one or more applications or programs 746, data 748, and the like. Fixed storage 740 is typically a secondary storage medium (such as a hard disk) that is slower than primary storage. In appropriate cases, the information stored by fixed storage 740 may be incorporated as virtual memory into memory 730.

Processors 720 may be coupled to a variety of interfaces, such as, for example, graphics control 754, video interface 758, input interface 760, output interface 762, and storage interface 764, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 756 may couple processors 720 to another computer system or to network 780. With network interface 756, processors 720 may receive or send information from or to network 780 in the course of performing steps of particular embodiments. Particular embodiments may execute solely on processors 720. Particular embodiments may execute on processors 720 and on one or more remote processors operating together.

In a network environment, where computer system 700 is connected to network 780, computer system 700 may communicate with other devices connected to network 780. Computer system 700 may communicate with network 780 via network interface 756. For example, computer system 700 may receive information (such as a request or a response from another device) from network 780 in the form of one or more incoming packets at network interface 756 and memory 730 may store the incoming packets for subsequent processing. Computer system 700 may send information (such as a request or a response to another device) to network 780 in the form of one or more outgoing packets from network interface 756, which memory 730 may store prior to being sent. Processors 720 may access an incoming or outgoing packet in memory 730 to process it, according to particular needs.

Computer system 700 may have one or more input devices 766 (which may include a keypad, keyboard, mouse, stylus, etc.), one or more output devices 768 (which may include one or more displays, one or more speakers, one or more printers, etc.), one or more storage devices 770, and one or more storage medium 772. An input device 766 may be external or internal to computer system 700. An output device 768 may be external or internal to computer system 700. A storage device 770 may be external or internal to computer system 700. A storage medium 772 may be external or internal to computer system 700.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 730 may include one or more computer-readable storage media embodying software and computer system 700 may provide particular functionality described or illustrated herein as a result of processors 720 executing the software. Memory 730 may store and processors 720 may execute the software. Memory 730 may read the software from the computer-readable storage media in mass storage device 730 embodying the software or from one or more other sources via network interface 756. When executing the software, processors 720 may perform one or more steps of one or more processes described or illustrated herein, which may include defining one or more data structures for storage in memory 730 and modifying one or more of the data structures as directed by one or more portions the software, according to particular needs. In addition or as an alternative, computer system 700 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

In particular embodiments, computer system 700 may include one or more Graphics Processing Units (GPUs) 724. In particular embodiments, GPU 724 may comprise one or more integrated circuits and/or processing cores that are directed to mathematical operations commonly used in graphics rendering. In some embodiments, the GPU 724 may use a special graphics unit instruction set, while in other implementations, the GPU may use a CPU-like (e.g. a modified x86) instruction set. Graphics processing unit 724 may implement a number of graphics primitive operations, such as Miffing, texture mapping, pixel shading, frame buffering, and the like. In particular embodiments, GPU 724 may be a graphics accelerator, a General Purpose GPU (GPGPU), or any other suitable processing unit.

In particular embodiments, GPU 724 may be embodied in a graphics or display card that attaches to the hardware system architecture via a card slot. In other implementations, GPU 724 may be integrated on the motherboard of computer system architecture. Suitable graphics processing units may include Advanced Micro Devices®AMD R7XX based GPU devices (Radeon® HD 4XXX), AMD R8XX based GPU devices (Radeon® HD 5XXX), Intel® Larabee based GPU devices (yet to be released), nVidia® 8 series GPUs, nVidia® 9 series GPUs, nVidia® 100 series GPUs, nVidia® 200 series GPUs, and any other DX11-capable GPUs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. For example, other compression formats can be used, such as MJPEG-2000, Portable Network Graphics (PNG), and the like. Similarly, where appropriate, the appended claims encompass all changes, substitutions, variations, alterations, and modifications to the example embodiments herein that a person having ordinary skill in the art would comprehend.

What is claimed is:

1. A method comprising:
   executing, by a processor, an application that provides a video output for transmission to a client, the client being connected to a plurality of socket connections established between the client and the processor;
   generating, by the processor, the video output of the application, the video output comprising a composite video image;
   dividing, by the processor, a full video frame corresponding to the composite video image into a plurality of unique frame regions, each of the divided unique regions of the full video frame corresponding to a respective socket connection of the plurality of socket connections established for the same client and the number of divided unique regions corresponding to the number of the plurality of socket connections, wherein the divided unique regions comprise a target frame region and one or more positional frame regions positioned and rendered adjacent to the target frame region;
   rendering, by the processor, a plurality of separate video streams, wherein each of the separate video streams corresponds to a respective one of the plurality of divided unique frame regions of the composite video image, and wherein each of the separate video streams is executed as a separate thread to write to each of the plurality of socket connections established for the same client in parallel with other separate video streams corresponding to other divided unique frame regions;
   rendering, by the processor, a movement of the target frame region relative to the composite video image, wherein rendering comprises determining changes to a height or width of the one or more positional frame regions adjacent to the target frame region and transmitting a new frame having a new height and width over respective socket connections corresponding to the one or more positional frame regions.

2. The method of claim 1 further comprising
   encoding, by the processor, the video frames of the video streams using a stateless compression format.

3. The method of claim 2, wherein the stateless compression format is the M-JPEG format.

4. The method of claim 1, wherein the socket connections are Transmission Control Protocol (TCP) socket connections.

5. The method of claim 1, wherein determining if differences between a current video frame region and a previously rendered frame region corresponding to the divided unique region exceed a perceptual difference threshold further comprises:
   performing, by the processor, a pixel by pixel XOR (exclusive-or) operation on component values of respective bit maps of the current video frame region and the previously rendered video frame region; and determining, by the processor, if there are differences at each pixel based on the XOR operation.

6. The method of claim 1, wherein determining if differences between a current video frame region and a previously rendered frame region corresponding to the divided unique region exceed a perceptual difference threshold further comprises:

executing, by the processor, a memory comparison function for comparing the unique regions of the composite video image to detect if the differences between the current video frame region and a previously rendered frame region corresponding to the divided unique region exceed the difference threshold.

7. The method of claim 1, wherein determining if differences between a current video frame region and previously rendered frame region corresponding to the divided unique region exceed a perceptual difference threshold further comprises:

performing, by the processor, a pixel by pixel comparison on component values of respective bit maps of the current video frame region and the previously rendered video frame region; computing, by the processor, a distance value between component values of the respective bitmaps; and determining, by the processor, one of an average or a mean of the distance values;

comparing, by the processor, one of the average or the mean of the distance values to a threshold distance value; and determining, by the processor, the differences of the current video frame region from the previously rendered frame region based on the comparison.

8. An apparatus, comprising:
one or more processors;
a memory;
a network interface; and
computer program code stored in a non-transitory computer-readable storage medium and comprising computer-executable instructions for:
executing an application that provides a video output for transmission to a client, the client being connected to a plurality of socket connections established between the client and the processor;
generating the video output of the application, the video output comprising a composite video image;
dividing a full video frame corresponding to the composite video image into a plurality of unique frame regions, each of the divided unique regions of the full video frame corresponding to a respective socket connection of the plurality of socket connections established for the same client and the number of divided unique regions corresponding to the number of the plurality of socket connections, wherein the divided unique regions comprise a target frame region and one or more positional frame regions positioned and rendered adjacent to the target frame region;
rendering a plurality of separate video streams, wherein each of the separate video streams corresponds to a respective one of the plurality of divided unique frame regions of the composite video image, and wherein each of the separate video streams is executed as a separate thread to write to each of the plurality of socket connections established for the same client in parallel with other separate video streams corresponding to other divided unique frame regions;
rendering a movement of the target frame region relative to the composite video image, wherein rendering comprises determining changes to a height or width of the one or more positional frame regions adjacent to the target frame region and transmitting a new frame having a new height and width over respective socket connections corresponding to the one or more positional frame regions.

9. The apparatus of claim 8 wherein the computer program code further comprises instructions for:
encoding the video frames of the video streams using a stateless compression format.

10. The apparatus of claim 9 wherein the stateless compression format is the M-JPEG format.

11. The apparatus of claim 8 wherein the socket connections are Transmission Control Protocol (TCP) socket connections.

12. A non-transitory computer readable storage medium having stored thereon computer programming instructions for:
executing an application that provides a video output for transmission to a client, the client being connected to a plurality of socket connections established between the client and the processor;
generating the video output of the application, the video output comprising a composite video image;
dividing a full video frame corresponding to the composite video image into a plurality of unique frame regions, each of the divided unique regions of the full video frame corresponding to a respective socket connection of the plurality of socket connections established for the same client and the number of divided unique regions corresponding to the number of the plurality of socket connections, wherein the divided unique regions comprise a target frame region and one or more positional frame regions positioned and rendered adjacent to the target frame region;
rendering a plurality of separate video streams, wherein each of the separate video streams corresponds to a respective one of the plurality of divided unique regions of the composite video image, and wherein each of the separate video streams is executed as a separate thread to write to each of the plurality of socket connections established for the same client in parallel with other separate video streams corresponding to other divided unique frame regions;
rendering a movement of the target frame region relative to the composite video image, wherein rendering comprises determining changes to a height or width of the one or more positional frame regions adjacent to the target frame region and transmitting a new frame having a new height and width over respective socket connections corresponding to the one or more positional frame regions.

13. The non-transitory computer readable storage medium of claim 12 further comprising computer programming instructions for:
receiving from the client, a separate request for each of the plurality of video streams.

14. The non-transitory computer-readable storage medium of claim 13, further comprising computer programming instructions for:
transmitting to the client, an output providing access to the plurality of video streams.

* * * * *